United States Patent Office 2,968,678
Patented Jan. 17, 1961

2,968,678

PREPARATION OF INDANYL-SULFIDES, SULFOXIDES AND SULFONES

Alexis A. Oswald, Sarnia, Ontario, Canada, assignor to Esso Research and Engineering Company, a corporation of Delaware No Drawing. Filed Dec. 3, 1958, Ser. No. 777,861

7 Claims. (Cl. 260—607)

This invention relates to the manufacture of new substances having properties that make them valuable as additives for lubricating oil compositions; modifiers for synthetic rubber and petroleum resins; surface active agents; constituents of fly-repellants, insecticides, miticides, ovicides and fungicides; as intermediates for agricultural and pharmaceutical chemicals; and for other and numerous uses.

This invention has, as an object, the preparation of new and useful chemical compounds. These new compounds may be represented by the formula:

$$R-\underset{\underset{(O)_{0-1}}{\|}}{\overset{\overset{(O)_{0-1}}{\|}}{S}}-R'$$

wherein R is selected from the group consisting of the 2-indanyl radical and alkyl substituted 2-indanyl radicals wherein at least one hydrogen atom on an indanyl radical is replaced by an alkyl radical of 1 to 5 carbon atoms, and R' is selected from the group consisting of a $C_6$ to $C_{14}$ aromatic hydrocarbon radical selected from the group consisting of phenyl, tolyl, xylyl, naphthyl and anthracyl radicals, and a halogen substituted $C_6$ to $C_{14}$ aromatic hydrocarbon radical wherein at least one hydrogen atom attached to an aromatic ring is replaced by a halogen atom. A further object resides in devising novel procedures whereby these new chemical compounds may be obtained. Other objects will appear hereinafter.

These objects are accomplished by a non-catalytic addition of mercaptans to indene and alkyl substituted indene compounds wherein one or more hydrogen atoms of the indene molecule are replaced by an alkyl radical of 1 to 5 carbon atoms to produce indanyl sulfides and by the oxidation of these sulfides to the corresponding indanyl sulfoxides and sulfones.

The addition of mercaptans to olefins in general is a known reaction usually proceeding concurrently with both an ionic and a radical chain mechanism. It is generally necessary to use a catalyst which initiates mercapto radicals for effecting a mercaptan addition predominantly with a radical mechanism. However, it was discovered in the present invention that mercaptans add with a surprising ease to indene and alkyl substituted indene compounds by a radical mechanism in the absence of catalysts. The mechanism of the reaction was proven by the identity of the sulfides from reactions in the absence and in the presence of peroxides.

Mercaptans suitable for use with this invention include aromatic mercaptans and halogen substituted aromatic mercaptans such as thiophenol, toluene thiol, naphthalene thiol chlorothiophenol or bromothiophenol. The alkyl substituted indene compounds suitable for use with this invention include such substituted indenes as 1-methylindene, 2,3-dimethylindene, 1-ethylindene, 5-methylindene, 6-ethylindene, 4,7-dimethylindene, 6-propylindene and 5-ethyl-7-methylindene.

The sulfides of this invention may be produced at temperatures in the range of —25° C. to 150° C. and at atmospheric, subatmospheric, and superatmospheric pressures in the range of 0.2 to 50 atmospheres. The reactions may be carried out either with or without the employment of an inert diluent such as methanol, benzene, chloroform and n-hexane.

The sulfoxides of this invention are prepared by the oxidation of indanyl sulfides at a temperature in the range of —20° C. to 100° C. The oxidant for these reactions may be air, molecular oxygen, ozone, hydrogen peroxide or peracids.

The sulfones of this invention are prepared by a more vigorous oxidation of indanyl sulfides than is employed in the production of the aforesaid sulfoxides. In addition for the preparation of the sulfones, a double quantity of the oxidant is necessary than that which is used for the preparation of sulfoxides. Indanyl sulfones are prepared at temperatures in the range of —20° C. to 150° C. Suitable oxidants for preparing indanyl sulfones include hydrogen peroxide, hydrocarbon hydroperoxides, peracids and peracid salts. The oxidations are preferably carried out in an organic solvent such as acetic acid or acetic anhydride or a mixture of the same.

The sulfide compounds herein involved may be prepared employing equimolar amounts of the mercaptan and indene reactants or either of such reactants may be in excess. However, it is preferred that there be employed at least one mole of the indene reactant per each mole of mercaptan reactant.

The invention is illustrated but not limited by the following examples.

EXAMPLE 1

*Preparation of indanyl phenyl sulfide*

11.0 grams (0.1 mol) of thiophenol and 11.6 grams (0.1 mol) of indene were mixed in a reaction zone, i.e. a 50 mls. round bottomed flask, and the mixture was kept around 90° C. for two hours. An exothermic reaction took place and the raw product (a liquid at this temperature) was obtained. The product was purified by vacuum distillation and 19.5 grams, i.e. a yield of 86% of indanyl phenyl sulfide was obtained at between 145 and 146° C. at 2 mm. pressure. This product solidified at room temperature. Analysis of the product revealed the following:

| Formula | M.P. ° C. | Carbon | | Hydrogen | | Sulphur | |
|---|---|---|---|---|---|---|---|
| | | Calcd. | Found | Calcd. | Found | Calcd. | Found |
| 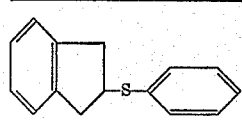 | 46–47 | 79.65 | 80.1 | 6.20 | 6.25 | 14.1 | 13.9 |

EXAMPLE 2

*Preparation of indanyl 4-toluyl sulfide*

12.4 grams (0.1 mol) of p-toluene thiol was dissolved in 11.6 grams (0.1 mol) of indene at room temperature. The reaction mixture so obtained was allowed to stand for four days. By the end of this period it solidified to a crystal mass. This was recrystallized from n-heptane and ethanol to give 21.6 grams, i.e. a yield of 90% purified indanyl p-toluyl sulfide as white, rhombic plates. An analysis of the crystals revealed the following:

| Formula | M.P. ° C. | Carbon | | Hydrogen | | Sulphur | |
|---|---|---|---|---|---|---|---|
| | | Calcd. | Found | Calcd. | Found | Calcd. | Found |
| 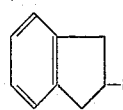 | 86–86.5 | 80.0 | 80.7 | 6.67 | 6.67 | 13.3 | 13.3 |

EXAMPLE 3

*Preparation of indanyl 4-chlorophenyl sulfide*

14.5 grams (0.1 mol) of 4-chlorothiophenol and 11.6 grams (0.1 mol) of indene and 35 mls. of n-heptane solvent were mixed in a 100 mls. round bottomed flask. The resulting solution was heated for 3 hours on a water bath. Then it was allowed to come to room temperature, when the reaction product crystallized out of the solution. After recrystallization from n-heptane 23.2 grams, i.e. a yield of 89% indanyl 4-chlorophenyl sulfide was obtained. An analysis revealed the following:

| Formula | M.P. ° C. | Carbon | | Hydrogen | | Sulphur | |
|---|---|---|---|---|---|---|---|
| | | Calcd. | Found | Calcd. | Found | Calcd. | Found |
| 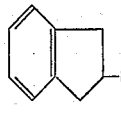 | 90–91 | 69.08 | 68.7 | 5.02 | 5.17 | 12.29 | 11.9 |

EXAMPLE 4

*Preparation of indanyl 2-naphthyl sulfide*

8 grams (0.05 mol) of 2-naphthalene thiol was dissolved in 5.8 grams (0.05 mol) of indene by heating on a water bath. After the dissolution of the 2-naphthalene thiol, the reaction mixture was allowed to cool down and stand for 4 days at ambient temperature. The crystal mass resulted after this period was recrystallized from 30 mls. of n-heptane and yielded 12.6 grams, i.e. 91% purified indanyl naphthyl sulfide as needle-like colourless crystals. An analysis of the product revealed the following composition:

| Formula | M.P. ° C. | Carbon | | Hydrogen | | Sulphur | |
|---|---|---|---|---|---|---|---|
| | | Calcd. | Found | Calcd. | Found | Calcd. | Found |
| 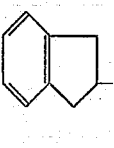 | 99–100 | 82.61 | 83.2 | 5.79 | 5.89 | 11.6 | 11.2 |

EXAMPLE 5

*Preparation of indanyl 4-chlorophenyl sulfide in the presence of cumene hydroperoxide catalyst*

14.5 grams (0.1 mol) 4-chlorothiophenol, 11.6 grams (0.1 mol) indene and 0.75 gram (0.005 mol) cumene hydroperoxide were dissolved in a solvent mixture consisting of 150 mls. of cyclohexane and 50 mls. of benzene. The resulting solution was allowed to stand for 12 hours at room temperature in a 300 mls. bottle closed air-tight. The bottle was opened and heated on a water bath at 78° C. for one-half hour while bubbling nitrogen into the solution (blanket against oxidation). Then the solution was allowed to cool to room temperature, while continuing nitrogen bubbling for concentration. The concentrate was recrystallized from benzene-cyclohexane and gave 22.7 grams, i.e. a yield of 87% indanyl 4-chlorophenyl sulfide. The substance had a melting point of 89–90.5° C. and gave no melting point depression with the product prepared with the method described in Example 3.

EXAMPLE 6

*Preparation of indanyl 4-toluyl sulfoxide*

2.4 grams (0.01 mol) of indanyl p-toluyl sulfide were dissolved in a mixture of 40 mls. acetic anhydride and 15 mls. of acetic acid. To the solution 0.01 mol (0.34 gram) of hydrogen peroxide was added in the form of an aqueous 30% solution. The reaction mixture was allowed to stand for three days at room temperature. The solution was then diluted with 3 volumes of water and the raw sulfoxide precipitated. The raw product was recrystallized from methanol, and 2.3 grams, i.e. a yield of 79%, of indanyl 4-toluyl sulfoxide was obtained. This compound is a white crystalline substance at room temperature. An analysis of this compound revealed the following:

| Formula | M.P. °C. | Carbon | | Hydrogen | | Sulphur | |
|---|---|---|---|---|---|---|---|
| | | Calcd. | Found | Calcd. | Found | Calcd. | Found |
| indanyl-S(O)-C6H4-CH3 | 107–108 | 75.00 | 74.89 | 6.25 | 6.34 | 12.5 | 12.8 |

EXAMPLE 7
*Preparation of indanyl 4-chlorophenyl sulfoxide*

13 grams (0.05 mol) indanyl 4-chlorophenyl sulfide was dissolved in acetic anhydride-acetic acid mixture and reacted with an aqueous solution of 0.05 mol (1.7 grams) of hydrogen peroxide under conditions given in the previous example. After precipitation by water and recrystallization from ethanol 11 grams, i.e. 87% of indanyl 4-chlorophenyl sulfoxide was obtained. An analysis revealed the following:

| Formula | M.P. °C. | Carbon | | Hydrogen | | Sulphur | |
|---|---|---|---|---|---|---|---|
| | | Calcd. | Found | Calcd. | Found | Calcd. | Found |
| indanyl-S(O)-C6H4-Cl | 97–98 | 65.08 | 64.64 | 4.73 | 4.83 | 11.58 | 10.6 |

EXAMPLE 8
*Preparation of indanyl 4-toluyl sulfoxide from p-toluene thiol and indene in one step*

6.2 grams (0.05 mol) of p-toluene thiol, 5.8 grams (0.05 mol) of indene and a mixture containing 9 grams (0.1 mol) butyl hydroperoxide and 3.7 grams (0.025 mol) bis-tertiary-butyl peroxide were placed into a 50 mls. round bottomed flask. The reaction mixture so obtained was heated on a water bath until a strong evolution of bubbles indicated decomposition (2–3 minutes at water bath temperature). Then it was cooled to room temperature and allowed to stand for 3 days. After this period the volatile byproducts were removed by distillation from a water bath at 10 mm. pressure. The residue was filtered and the solid remained on the filter was recrystallized from benzene-n-heptane. 8 grams, i.e. a yield of 62.4% indanyl 4-toluyl sulfoxide was obtained. This product did not give melting point depression in mixture with the substance prepared in Example 6.

EXAMPLE 9
*Preparation of indanyl 4-toluyl sulfone*

2.4 grams (0.01 mol) of indanyl p-toluyl sulfide was dissolved in a mixture of 40 mls. of acetic anhydride and 15 mls. of acetic acid. To this solution 0.2 mol (0.68 gram) hydrogen peroxide was added and the solution was heated on a water bath for fifteen minutes. The reaction mixture was then diluted with 3 volumes of water to precipitate the crude product. This was then recrystallized from methanol. A yield of 2.6 grams, i.e. a yield of 94% of indanyl 4-toluyl sulfone was obtained. This product is a white crystalline solid at room temperature. An analysis of this product revealed the following:

| Formula | M.P. °C. | Carbon | | Hydrogen | | Sulphur | |
|---|---|---|---|---|---|---|---|
| | | Calcd. | Found | Calcd. | Found | Calcd. | Found |
| indanyl-SO2-C6H4-CH3 | 134.5–135.5 | 70.59 | 70.41 | 5.88 | 5.91 | 11.76 | 11.3 |

EXAMPLE 10
*Preparation of indanyl phenyl sulfone*

11.3 grams (0.05 mol) of indanyl phenyl sulfide was dissolved in a mixture of 35 mls. acetic anhydride and 15 mls. acetic acid. The solution was warmed up to 60° C. and 0.1 mol (3.4 grams) of hydrogen peroxide was added dropwise to it in the form of an aqueous 30% solution while keeping it at this temperature. Thereafter the solution was heated to 80° C. in the course of 15 minutes. Then it was allowed to come to room temperature and mixed with a triple quantity of ice for the precipitation of the sulfone. After recrystallization from methanol 12.6 grams, i.e. a yield of 91% white crystalline product was obtained. An analysis revealed the following:

| Formula | M.P. °C. | Carbon | | Hydrogen | | Sulphur | |
|---|---|---|---|---|---|---|---|
| | | Calcd. | Found | Calcd. | Found | Calcd. | Found |
| indanyl-SO2-C6H5 | 107–108 | 68.77 | 69.01 | 5.46 | 5.83 | 12.39 | 10.7 |

EXAMPLE 11

*Preparation of indanyl 4-chlorophenyl sulfone*

13.9 grams (0.05 mol) of indanyl 4-chlorophenyl sulfoxide is dissolved in a mixture of 30 mls. acetic acid and 60 mls. acetic anhydride. To the solution 0.05 mol (1.7 grams) of hydrogen peroxide is added in the form of an aqueous 30% solution. The reaction mixture is kept for three days at room temperature. The solution is then diluted with 4 volumes of water and the raw sulfone precipitated. The raw product is recrystallized from ethanol and 13.8 grams, i.e. 94% of indanyl 4-chlorophenyl sulfone is obtained. An analysis of the white crystalline product revealed the following:

| Formula | Carbon | | Hydrogen | | Sulphur | |
|---|---|---|---|---|---|---|
| | Calcd. | Found | Calcd. | Found | Calcd. | Found |
|  | 61.53 | 61.73 | 4.47 | 4.75 | 10.95 | 10.1 |

EXAMPLE 12

*Preparation of indanyl 2-naphthyl sulfone*

2.76 grams (0.01 mol) of indanyl 2-naphthyl sulfide is dissolved in 80 mls. of glacial acetic acid. The solution is heated on the water bath and in small portions 2.6 grams (0.016 mol) of potassium permanganate is added to it. After 1 hour the reaction mixture is treated with hydrogen sulfide ($SO_2$) until discolouration. Then the sulfone is precipitated from the solution by adding 3 volumes of water to it. It is obtained as a colourless crystalline substance after recrystallization from a benzene n-heptane mixture, in 78% yield (2.4 grams). An analysis revealed the following:

| Formula | M.P. °C. | Carbon | | Hydrogen | | Sulphur | |
|---|---|---|---|---|---|---|---|
| | | Calcd. | Found | Calcd. | Found | Calcd. | Found |
|  | 140-141 | 73.99 | 74.08 | 5.23 | 6.18 | 10.4 | 9.7 |

EXAMPLE 13

*The preparation of a miticide composition using indanyl 4-chlorophenyl sulfone*

10 grams of indanyl 4-chlorophenyl sulfone and 90 grams of talcum powder are added into a small ball mill. Then the contents are milled for 2½ hours in order to obtain a thorough mixing of biologically active indanyl 4-chlorophenyl sulfone and the talcum carrying agent. By this method a free flowing powder is obtained. This can be applied by conventional dusting machinery on agricultural crops, e.g. cotton infested with arachnids (order Acarina). Upon inspection after 24 hours the infestation is found to be markedly reduced.

It is to be understood that all percentages recited herein unless otherwise designated refer to weight percents.

The term "2-indanyl radical" is used herein to refer to the residue of an indane molecule from which a hydrogen atom has been removed from the number 2 carbon atom.

What is claimed is:

1. A composition of matter represented by the formula $$R-\underset{(O)_{0-1}}{\overset{(O)_{0-1}}{S}}-R'$$

wherein R is selected from the group consisting of the 2-indanyl radical and alkyl substituted 2-indanyl radicals wherein at least one hydrogen atom of the 2-indanyl radical is replaced by a $C_1$ to $C_5$ alkyl radical and R' is a $C_6$ to $C_{14}$ aromatic radical selected from the group consisting of phenyl, tolyl, xylyl, naphthyl and anthracyl hydrocarbon radicals and monochlorinated derivatives thereof wherein a hydrogen atom is replaced by a chlorine atom.

2. 2-indanyl 4-toluyl sulfide.
3. 2-indanyl 4-chlorophenyl sulfide.
4. 2-indanyl 2-naphthyl sulfide.
5. 2-indanyl 4-chlorophenyl sulfoxide.
6. 2-indanyl 4-chlorophenyl sulfone.
7. A noncatalytic process for preparing a composition of matter represented by the formula

R—S—R' wherein R is selected from the group consisting of the 2-indanyl radical and alkyl substituted 2-indanyl radicals wherein at least one hydrogen atom of the 2-indanyl radical is replaced by a $C_1$ to $C_5$ alkyl radical and R' is a $C_6$ to $C_{14}$ aromatic hydrocarbon radical selected from the group consisting of phenyl, tolyl, xylyl, naphthyl and anthracyl hydrocarbon radicals and monochlorinated derivatives thereof wherein a hydrogen atom is replaced by a chlorine atom which comprises reacting a mercaptan represented by the formula

H—S—R' wherein R' is an aromatic radical as aforedefined with a hydrocarbon compound selected from the group consisting of indene and alkyl substituted indenes wherein at least one hydrogen atom of indene is replaced by a $C_1$ to $C_5$ alkyl radical at a temperature in the range of —25° C. to 150° C. and a pressure in the range of 0.2 to 50.0 atmospheres.

References Cited in the file of this patent

Champaigne et al.: J. Am. Chem. Soc., 76, 1272–5 (1954).